Figure 1:
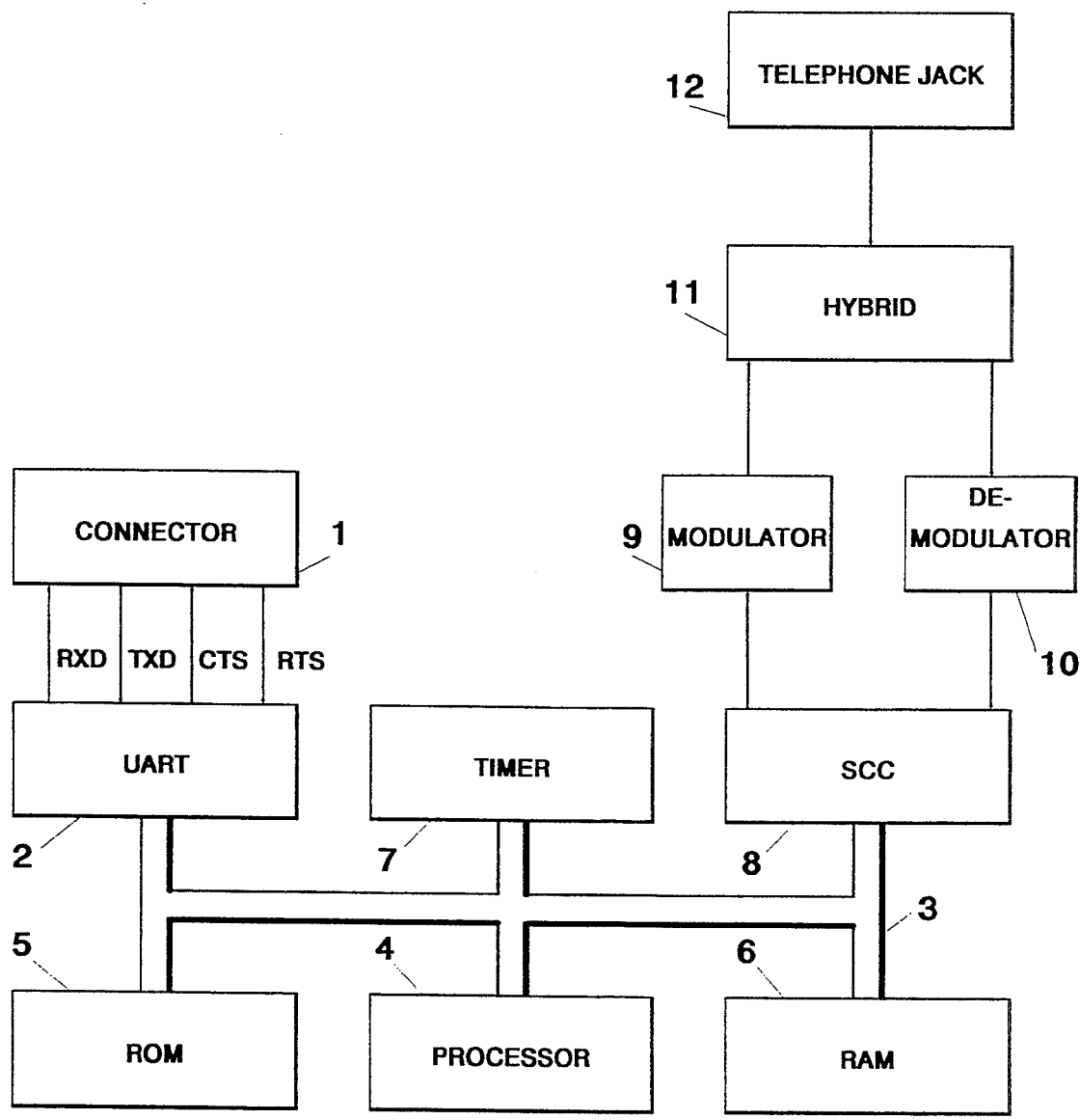

United States Patent [19]

Treffkorn

[11] Patent Number: 5,343,515
[45] Date of Patent: Aug. 30, 1994

[54] HIGH SPEED MODEM

[76] Inventor: Remco V. Treffkorn, 870 Clubhouse Dr., Aptos, Calif. 95003

[21] Appl. No.: 759,408

[22] Filed: Sep. 13, 1991

[51] Int. Cl.5 .......................................... H04M 11/00
[52] U.S. Cl. ........................................ 379/97; 379/98; 375/8
[58] Field of Search ...................... 379/97, 98, 96, 93; 375/8, 121

[56] References Cited

U.S. PATENT DOCUMENTS

| | | | |
|---|---|---|---|
| 4,236,248 | 11/1980 | Teramura et al. | 375/8 |
| 4,680,781 | 7/1987 | Amundson et al. | 379/93 |
| 4,771,417 | 9/1988 | Maxwell et al. | 379/98 |
| 4,890,316 | 12/1989 | Walsh et al. | 379/98 |
| 5,008,901 | 4/1991 | Wallach et al. | 375/122 |
| 5,072,407 | 12/1991 | Gutz et al. | 375/121 |
| 5,267,263 | 11/1993 | Feezel et al. | 375/7 |

*Primary Examiner*—Curtis Kuntz
*Assistant Examiner*—Stella L. Woo
*Attorney, Agent, or Firm*—LaRiviere & Grubman

[57] ABSTRACT

A modem having at least two modem protocols, a slow full duplex protocol and a fast half duplex protocol, for use of either depending on a received rate of data. A modem for switching between a plurality of protocols for data transmission and reception. The modem capable of switching between a fast and a slow protocol depending on the received rate of data. The received rate of data determined by measuring received amounts of data during predetermined time intervals. Alternatively, the received data rate determined by measuring an amount of data stored in a memory. The modem capable of full duplex interactive operation and 9600 BPS data transfers in a seamless manner. The modem operable with streaming error correction protocols. Also, described is a method for communication of data between at least two modems each capable of operating at a plurality of data rates. Also, described is a system for communication of binary data comprising a binary data source and a modem.

7 Claims, 1 Drawing Sheet

HIGH SPEED MODEM

BACKGROUND

1. Field of Invention

The present invention relates to the communication of digital information over voice grade telephone systems, specifically modem technology.

2. Description of Prior Art

Currently, modems capable of a telephone line transmission speed of 9600 BPS (Bits Per Second) or greater are available from many sources. Nonetheless, the vast majority of modems in operation today operate at speeds of 2400 BPS or less. The inventors research indicates, the principal reason that millions of users choose 2400 BPS modems over 9600 BPS modems is the large cost differential.

The 9600 BPS modem technology in widest use today is the CCITT v.32 modem standard. Since this standard supports simultaneous high speed communications in both directions (full duplex), it requires very complex and costly echo cancelling circuitry. Echo cancelling circuitry adds significant cost to the modem and often fails to fully achieve its desired functionality.

Object

It is the object of this invention to provide a 9600 BPS modem which costs only a fraction of that of current 9600 BPS modems. It is also the object to adapt and improve on readily available low cost modem technology to achieve a low cost general purpose 9600 BPS modem. A secondary object of this invention is to provide a modem architecture which will allow maximum throughput with streaming error correction protocols such as ZMODEM, running on inexpensive personal computers with slow input output response times.

Description of Invention

FIG. 1 shows the preferred embodiment.

Connector 1, normally an "RS-232 Port" connector is connected by a plurality of signal lines to a universal asynchronous receiver transmitter, "UART" 2. The UART is connected to a plurality of signal lines, "bus" 3. A bus is an organized plurality of signal lines carrying binary data to and from a computer processor 4; usually a microprocessor. All components described as connected to the bus are therefore connected to an organized plurality of signal lines. Read only memory, "ROM" 5, contains the computer program instructions which supervise and control all the functions of the modem. The ROM 5 is connected to the bus 3. Random access memory, RAM 6, is connected to bus 3. A time measuring circuit, timer 7 is connected to bus 3. A serial communications controller circuit, SCC 8, is connected to bus 3 and further connected to modulator 9 and demodulator 10. Modulator 9 and demodulator 10 are further connected to hybrid 11 which is further connected to telephone jack. Modulator 9 and demodulator 10 both operate at a plurality of data rates per second.

The following modem control program is executed on a Sierra SC11061 processor.

```
d3 38 6e 24 ef 9b 18 a1 bb 59 12 b1 fe 46 c6 12 46 94 41 41 f0
b2 44 6f 79 02 40 df 0b 79 05 40 99 00 40 da 03 ef 46 18 88 82
42 df da b0 6f 41 f0 ef cf 0c 3e 78 1a b0 41 46 ef de 0b d7 02
20 13 d6 0b 98 6d 41 d7 06 95 10 78 3c 78 03 91 10 79 e7 4e 18
a1 02 59 12 b2 12 47 18 01 47 a1 06 59 12 b0 6d 46 7a 12 46 98
47 46 d6 0f 99 00 40 df 03 b0 40 77 ef 4c 0c ef fe 17 f0 99 00
47 df 05 91 10 79 27 f2 91 02 7c 27 ed a1 08 59 12 b2 12 46 3a
46 56 a1 18 59 12 c2 12 42 a0 82 42 ef ca 0c ef 12 0b d7 18 99
01 46 d7 15 ef 08 0b 99 01 46 d7 25 ef 00 0b b0 46 6e 91 01 42
27 e3 20 61 99 02 46 d7 1d ef ee 0a 99 01 46 d7 10 ef e6 0a b0
46 6f 91 02 42 27 c9 71 fe 42 20 08 71 fd 42 20 03 ef d1 0a ef
03 0b 27 b7 b2 44 6e 65 01 00 44 b2 44 6f 79 03 40 df 0b 79 04
40 99 00 40 da 03 ef 69 17 88 82 42 d7 07 b0 6e 46 b0 6f 47 f0
ef 8e 17 a1 bb 59 12 b1 fe 46 c6 12 46 99 12 82 f0 99 03 42 a1
18 59 12 a2 12 42 df d7 27 e1 ef 00 0b b0 41 45 3b 41 1e 39 41
1c 3a 41 1f b0 46 44 ef 45 00 b1 fd 46 ef 07 0c 30 7c 09 ef 10
06 71 fe 7c 71 bf 79 f0 b0 46 44 ef 2c 00 a1 02 59 12 b2 12 46
18 01 46 df 0c b1 fd 46 ef e2 0b ef 2c 0b 39 45 db b0 7b 46 75
01 46 a1 07 59 12 c6 12 46 91 01 7c 91 40 79 f0 99 00 44 df 24
75 01 7b b0 7b 46 ef 0e 0a 65 04 00 12 a2 12 42 65 02 00 12 a2
12 40 ef 14 1a a1 18 41 12 c2 12 42 e0 44 dc f0 e7 7c 0a ef b2
0b ef fa 09 d7 3a 99 01 46 d7 14 ef f0 09 99 01 46 d7 28 ef e8
09 a1 bc 59 12 c6 12 46 27 e2 99 02 46 d7 14 ef d7 09 99 01 46
d7 0f ef cf 09 a1 bd 59 12 c6 12 46 27 c9 ef c3 09 ef f5 09 27
c1 b1 00 27 f0 a1 18 59 12 c2 12 42 a0 82 42 ef 62 0b ef aa 09
d7 46 99 01 46 d7 16 ef a0 09 b1 fe 43 99 01 46 d7 26 ef 95 09
b0 46 6e 91 01 42 27 e0 99 02 46 d7 1e ef 85 09 b1 fd 43 99 01
46 d7 0b ef 7a 09 b0 46 6f 91 02 42 27 c5 70 43 42 ef a1 09 27
bd ef 67 09 ef 99 09 27 b5 99 03 42 a1 18 59 12 a2 12 42 d7 0c
88 82 42 d7 07 b0 6e 46 b0 6f 47 f0 ef 32 16 99 12 82 f0 a1 04
```

```
59 12 b2 12 40 75 01 40 98 40 46 d7 34 99 01 47 de 2f 99 03 47
d2 2a b0 47 42 91 80 78 79 01 47 d7 19 91 40 78 ef 9f 15 ef 7e
15 df 08 ef af 04 ef f9 15 27 f0 ef d4 0a b1 08 77 91 02 79 ef
2a 18 f0 b1 00 6f ef ae 0a ef f6 08 d7 28 99 01 46 d7 1b ef ec
08 99 01 46 d7 0b ef e4 08 b0 46 6e b1 01 6f 27 e3 ef 0e 09 b1
00 6f 27 db ef d1 08 ef 03 09 27 d3 99 01 6f d7 09 88 82 42 d7
04 b0 6e 46 f0 ef a6 15 99 12 82 f0 37 78 27 a1 05 59 12 b2 12
47 75 01 47 98 47 46 d7 18 c6 12 46 3f 64 09 3e 64 06 ef 64 0a
b1 08 77 71 3f 78 b1 bf 46 ef 28 0a f0 b1 78 46 70 77 46 df 0c
ef 0b 00 ef 38 00 ef 73 00 ef b4 00 20 c8 a1 14 41 12 8a 12 82
df 16 3f 64 14 3e 64 03 91 40 78 91 80 78 91 08 79 a1 14 41 12
c2 12 82 f0 a1 0c 59 12 a2 12 42 ef ec 17 88 82 40 df e3 f0 37
27 3a 3e 27 37 3b 78 06 91 48 78 91 10 79 a1 0c 59 12 a2 12 42
ef cd 17 88 82 40 d7 1f 98 7b 7a d7 1a 31 78 17 a1 01 59 12 c6
12 76 b1 00 76 a1 00 59 12 c6 12 77 b1 80 77 91 40 27 f0 3f 78
3d 38 7c 3a 3f 79 37 a1 0c 59 12 a2 12 42 ef 95 17 88 82 40 df
2b 99 00 6c df 23 a1 0e 59 12 8a 12 40 d6 17 91 20 76 a1 26 59
12 8a 12 82 df 0b 98 7b 7a d7 09 89 0a 00 40 d3 03 91 80 79 ef
11 09 f0 31 7c 12 a1 22 41 12 b2 12 46 99 00 46 df 06 71 fd 7c
91 10 79 f0 3b 77 17 3c 77 1c 3d 77 21 3e 77 23 39 77 09 3a 77
06 38 77 01 f0 20 dd 20 1d ef 92 00 ef a2 00 20 c3 ef 8a 00 ef
3c 00 20 bb ef 72 00 20 b6 ef 32 00 ef 6a 00 20 ae 30 76 29 a1
1a 59 12 8a 12 82 d7 20 35 78 17 71 df 78 b1 fe 46 ef fa 08 a1
bb 59 12 b1 04 46 c6 12 46 91 01 79 f0 91 20 79 91 20 78 f0 31
76 37 a1 1c 59 12 8a 12 82 d7 2e 3e 79 2b 3f 78 28 b0 7b 46 75
01 46 a1 07 59 12 c6 12 46 91 01 7c 91 40 79 a1 02 59 12 b2 12
46 18 01 46 df 09 b1 fd 46 ef ae 08 ef f8 07 f0 32 76 0c a1 1e
59 12 8a 12 82 d7 03 91 10 79 f0 33 76 0f a1 20 59 12 8a 12 82
d7 06 91 10 79 ef 1b 08 f0 34 76 1f a1 22 59 12 8a 12 82 d7 16
65 02 00 12 8a 12 82 d7 0d a1 bb 59 12 b1 05 46 c6 12 46 91 01
79 f0 36 76 0c a1 28 59 12 8a 12 82 d7 03 91 04 79 f0 37 76 2a
a1 2a 59 12 8a 12 82 d7 21 71 7f 76 a1 0a 5f 12 b2 12 12 35 12
0a 3a 12 0e a1 b8 0b 46 e7 26 08 3f 36 04 b1 80 77 f0 91 20 79
f0 20 72 20 8a 3f 77 39 a1 03 59 12 b2 12 6e ef 91 00 d7 2d 99
00 46 df 1b 38 46 1e 3e 77 e4 3d 77 df 3c 77 0f 3b 77 45 3a 77
09 39 77 14 35 46 03 b1 02 77 31 78 00 ef b9 00 a1 03 59 12 c6
12 6e f0 3c 46 02 27 ed ef 0d 08 a1 04 59 12 c6 12 82 a1 05 59
12 c6 12 82 a1 08 59 12 b2 12 46 30 46 03 ef 0d 0d ef 7e 08 b1
08 77 27 c7 37 46 03 b1 10 77 27 bf 34 46 0f a1 06 59 12 b2 12
47 98 6d 47 d7 03 b1 08 77 37 46 03 b1 40 77 27 a5 34 46 0f a1
06 59 12 b2 12 47 98 6d 47 d7 03 b1 10 77 27 91 99 00 6e df 1a
99 00 70 d7 1b 38 6e 33 3e 6e 16 3f 6e 16 34 6e 09 33 78 06 3c
79 03 91 02 78 b0 6e 46 94 6e 6e f0 30 7c f6 a1 02 59 12 b2 12
46 18 01 46 d7 ea b1 fd 46 ef 49 07 ef 93 06 27 df b1 80 77 b1
00 27 27 d7 20 6c 21 08 20 76 20 8f 99 00 79 df 26 38 79 24 39
79 ed 3a 79 ec 3b 79 47 3c 79 e8 3d 79 20 3f 78 11 3e 79 e1 91
80 6e ef a0 02 d7 03 ef 15 03 71 7f 79 f0 91 01 6e ef 1a 04 71
fe 79 20 1e 91 20 6e 71 df 79 a0 82 40 a1 00 58 44 3a 78 0b 32
77 05 ef c0 01 20 03 ef 1c 01 ef 1d 06 e7 5f 15 91 08 6e 71 f7
79 ef 6b 04 ef b3 06 27 ef 91 02 6e 71 fd 79 ef 1a 04 71 3f 78
27 e1 91 10 6e 71 ef 79 ef 4c 03 b1 fb 46 ef b1 06 ef 41 06 a1
06 59 12 c6 12 6d 27 c6 a1 02 59 12 b2 12 40 18 01 40 df 05 99
00 6c df 23 a1 07 59 12 b2 12 46 78 7b 46 99 00 46 d2 15 b0 7b
46 75 01 46 b0 46 47 78 7a 47 99 00 47 da 12 71 bf 79 f0 b2 12
46 b0 46 47 78 7a 47 99 00 47 d2 ee 99 00 40 df 05 74 6c 47 de
e4 91 40 6e b0 46 47 75 01 47 c6 12 47 ef 97 02 df 12 b1 fd 46
ef 41 06 71 bf 79 71 bf 6e 71 fe 7c 91 01 79 71 7f 79 27 27 71
fb 79 a1 0a 59 12 b2 12 46 79 01 46 d6 15 b1 bf 46 ef 1b 06 91
01 79 a1 bb 59 12 b1 04 46 c6 12 46 27 03 c6 12 46 91 04 6e a1
00 58 44 a0 82 40 27 2a 79 07 40 99 00 40 da 03 ef 0e 11 f0 3c
7d 27 a1 09 59 12 b2 12 46 79 01 46 de 1b c6 12 46 a1 10 59 12
```

```
a2 12 46 65 02 00 46 c2 12 46 a2 46 46 a1 0e 59 12 c2 12 46 f0
a1 16 59 12 c2 12 44 a1 42 e7 12 b1 0b 47 b2 12 46 c6 44 46 65
01 00 12 65 01 00 44 e0 47 ef a1 02 01 46 ef 28 04 b1 02 46 3f
d3 03 3e d3 03 b1 03 46 c6 44 46 65 01 00 44 a1 03 01 46 ef 0e
04 a1 4d e7 12 b2 12 46 c6 44 46 65 01 00 44 a1 04 02 46 ef f9
03 a1 40 00 46 ef f2 03 a1 08 01 46 ef eb 03 b1 03 46 c6 44 46
65 01 00 44 30 65 21 a1 09 01 46 ef d7 03 b1 01 46 c6 44 46 a1
16 59 12 a2 12 44 b1 1a 46 c6 44 46 a0 82 40 91 04 78 f0 a1 16
59 12 a2 12 44 a0 82 40 91 04 78 f0 a1 08 59 12 b2 12 6f a1 16
59 12 c2 12 44 b1 0a 40 65 01 00 44 a1 43 e7 12 b0 40 47 b2 12
46 c6 44 46 65 01 00 12 65 01 00 44 e0 47 ef a1 02 01 46 ef 7b
03 b1 02 46 30 6f 03 b1 03 46 c6 44 46 65 01 00 44 75 01 40 37
6f 18 a1 03 01 46 ef 5e 03 a1 02 59 12 b2 12 46 c6 44 46 65 01
00 44 75 01 40 a1 04 02 46 ef 46 03 a1 40 00 46 ef 3f 03 36 6f
1a a1 08 01 46 ef 35 03 b1 06 46 70 6f 46 18 01 46 c6 44 46 65
01 00 44 75 01 40 30 65 13 34 7d 10 a1 09 01 46 ef 15 03 b1 01
46 c6 44 46 75 01 40 a1 16 59 12 a2 12 44 c6 44 40 a0 82 40 91
04 78 f0 20 73 ef 8d 03 d7 f9 a1 0c 59 44 a2 44 42 ef 67 12 ef
a0 12 a0 42 46 ef c4 12 c2 44 42 a0 46 42 ef 5e 02 a1 08 59 12
b2 12 46 3a 46 36 b1 04 46 c6 44 46 65 01 00 44 b1 04 46 c6 44
46 65 01 00 44 b1 01 47 c6 44 47 65 01 00 44 c6 44 47 65 01 00
44 75 01 7a c6 44 7a a1 16 59 12 a2 12 44 94 47 47 f0 b1 02 46
c6 44 46 65 01 00 44 b1 04 46 c6 44 46 27 d9 71 7f 6e 99 12 82
f0 b0 7a 46 71 0f 46 94 47 47 09 03 46 a1 3a 59 12 64 46 12 a1
0c 00 46 c2 12 46 65 02 00 12 c2 12 44 65 02 00 12 c2 12 42 65
02 00 12 c2 12 40 ef 48 12 79 01 6c a1 02 59 12 b2 12 46 18 01
46 df 03 ef 00 03 f0 ef 03 02 a2 12 46 79 01 46 de 2e c2 12 46
65 02 00 12 a2 12 44 65 02 00 12 a2 12 42 65 02 00 12 a2 12 40
ef 0f 12 a1 02 59 12 b2 12 46 18 01 46 df 03 79 01 6c 99 00 82
f0 a1 bb 59 12 b1 04 46 c6 12 46 27 f3 20 62 ef 99 01 a1 08 59
12 b2 12 46 3a 46 f1 b1 07 46 c6 44 46 65 01 00 44 b1 05 46 c6
44 46 65 01 00 44 b1 01 47 c6 44 47 65 01 00 44 c6 44 47 65 01
00 44 c6 44 6d 65 01 00 44 b1 02 46 c6 44 46 65 01 00 44 c6 44
47 65 01 00 44 3b 78 2e a1 22 41 12 b2 12 46 c6 44 46 a1 16 59
12 a2 12 44 a0 82 40 f0 b1 03 46 c6 44 46 65 01 00 44 b1 05 46
c6 44 46 65 01 00 44 c6 44 6d 27 cb b1 00 46 71 ef 78 27 d1 ef
16 01 b1 04 46 c6 44 46 65 01 00 44 b1 02 46 c6 44 46 65 01 00
44 b1 01 46 c6 44 46 65 01 00 44 c6 44 46 65 01 00 44 a1 bb 59
12 b2 12 46 c6 44 46 a1 16 59 12 a2 12 44 a0 82 40 f0 ef d9 00
b1 04 46 c6 44 46 65 01 00 44 b1 07 46 c6 44 46 65 01 00 44 b1
01 46 c6 44 46 65 01 00 44 c6 44 46 65 01 00 44 a1 04 59 12 b2
12 46 75 01 46 c6 44 46 c6 12 46 a1 16 59 12 a2 12 44 a0 82 40
f0 a1 0a 59 12 b1 0c 46 c6 12 46 a1 00 58 44 a1 16 59 12 c2 12
44 b1 07 46 c6 44 46 65 01 00 44 b1 06 46 c6 44 46 65 01 00 44
b1 01 46 c6 44 46 65 01 00 44 c6 44 46 65 01 00 44 a1 05 59 12
b2 12 46 75 01 46 c6 44 46 65 01 00 44 b1 02 46 c6 44 46 65 01
00 44 b1 01 46 c6 44 46 65 01 00 44 b0 64 46 18 06 46 75 01 46
c6 44 46 a1 16 59 12 a2 12 44 a0 82 40 f0 a1 12 59 12 a2 12 44
a0 44 46 65 08 00 46 89 60 58 46 de 04 a1 20 58 46 c2 12 46 a1
16 59 12 c2 12 44 f0 a1 14 59 12 a2 12 44 a0 44 46 65 08 00 46
89 a0 58 46 de 04 a1 60 58 46 c2 12 46 a1 16 59 12 c2 12 44 f0
71 0f 46 94 47 47 09 03 46 a1 3a 59 12 64 46 12 f0 79 01 40 99
00 40 de 09 b2 44 46 65 01 00 44 20 0e 79 01 41 99 00 41 de 09
ef 77 0c b1 00 40 98 47 47 f0 c6 44 46 65 01 00 44 c6 44 47 65
01 00 44 75 02 40 f0 99 00 40 df 22 b0 46 47 78 40 47 99 00 47
d2 0a 78 46 40 94 47 47 64 46 44 f0 b0 47 40 78 47 41 ef 5f 0c
b1 00 40 f0 b0 46 40 78 46 41 27 f1 b0 6d 47 75 01 47 78 47 46
99 00 46 d7 09 71 ef 78 75 01 6d 94 47 47 f0 b0 7a 40 78 7b 40
b1 08 41 78 7b 46 99 00 46 de 2c 98 46 40 de 27 38 7c 0e b0 40
41 78 46 41 78 41 47 d6 03 b1 00 47 b0 47 6c b1 01 41 98 46 40
df 0b b1 04 41 99 00 46 df 03 b1 02 41 f0 99 00 6c da 16 b0 7a
```

```
46 75 01 46 a1 02 59 12 78 7b 46 9a 12 46 d2 04 99 00 82 f0 99
12 82 f0 91 01 76 a1 1a 59 12 a1 90 01 46 c2 12 46 f0 39 76 21
a1 02 59 12 b2 12 46 18 01 46 a1 20 03 46 df 07 a1 2c 59 12 a2
12 46 a1 1c 59 12 c2 12 46 91 02 76 f0 3a 76 1d a1 02 59 12 b2
12 46 18 01 46 df 11 a1 30 59 12 a2 12 46 a1 1e 59 12 c2 12 46
91 04 76 f0 a1 02 59 12 b2 12 46 18 01 46 df 11 a1 32 59 12 a2
12 46 a1 20 59 12 c2 12 46 91 08 76 f0 a1 34 59 12 8a 12 82 d7
09 65 02 00 12 9a 12 82 df 1f a1 34 59 12 a2 12 46 a1 22 59 12
c2 12 46 a1 36 59 12 a2 12 46 a1 24 59 12 c2 12 46 91 10 76 f0
a1 2e 59 12 a2 12 46 a1 28 59 12 c2 12 46 91 40 76 f0 a1 2a 59
12 c2 12 46 91 80 76 f0 70 46 76 f0 b1 00 76 a1 02 59 12 b2 12
46 18 01 46 df 03 ef 7d ff ef 98 ff f0 79 01 40 b0 40 41 79 06
41 99 00 41 da 04 b1 06 40 f0 b1 00 41 f0 b1 00 7a b1 00 7b b1
00 6d a1 02 59 12 b2 12 6c a1 06 59 12 c6 12 82 b1 00 79 71 ef
78 71 fe 7c 27 b2 a1 90 01 46 a1 2c 01 44 3f d3 13 a1 58 02 46
a1 bc 02 44 36 d3 08 a1 34 08 46 a1 1c 0c 44 a1 2c 59 12 c2 12
46 a1 2e 59 12 c2 12 46 a1 30 59 12 08 01 46 c2 12 46 a1 32 59
12 c2 12 44 a1 63 00 12 b2 12 44 94 45 45 fe 6d 70 17 44 a1 34
59 12 c2 12 44 65 02 00 12 c2 12 46 a1 10 40 12 b2 12 44 94 45
45 a1 38 59 12 c2 12 44 26 f2 a1 08 59 12 b2 12 46 b1 0c 47 a1
09 59 12 c6 12 47 a1 40 00 44 a1 96 e7 40 39 64 0d 30 64 1d a1
80 00 44 a1 7e e7 40 20 13 a1 c0 00 44 a1 66 e7 40 30 64 08 a1
00 01 44 a1 4e e7 40 a1 10 59 12 c2 12 40 a1 0e 59 12 c2 12 44
f0 b1 00 76 b1 01 77 b1 00 78 b1 00 7c b1 00 7d b1 00 79 ef 4c
14 a1 0a 5f 12 b2 12 46 35 46 09 3a 46 0d a1 b8 0b 46 20 0b a1
58 02 46 37 36 04 a1 64 00 46 ef b5 fe a1 02 59 12 b1 01 46 c6
12 46 a1 03 59 12 c6 12 82 a1 16 41 12 a2 12 46 a1 0c 59 12 c2
12 46 a1 0e 59 12 a1 00 01 46 c2 12 46 a1 06 59 12 c6 12 82 a1
07 59 12 c6 12 82 a1 12 59 12 a1 20 58 46 c2 12 46 a1 14 59 12
a1 60 58 46 c2 12 46 a1 bb 59 12 c6 12 82 a1 bc 59 12 c6 12 82
a1 bd 59 12 c6 12 82 26 ad 71 b5 78 a1 00 59 12 b2 12 77 b1 00
6c 91 10 79 ef 9a fe a1 01 59 12 b2 12 42 18 02 42 d3 03 ef 86
fd 18 01 42 d3 03 ef a3 fd 18 01 42 d3 03 ef bc fd 18 01 42 d3
03 ef d2 fd 18 01 42 d3 03 91 20 76 18 01 42 d3 03 ef f4 fd f0
17 01 02 01 06 01 00 00 00 00 ff 04 00 00 00 01 c0 00 c0 00 80
00 80 00 80 00 40 00 40 00 40 00 20 00 20 00 20 00 c0 00 80 00
80 00 80 00 40 00 40 00 40 00 40 00 20 00 20 00 20 00 20 00 80
00 80 00 40 00 40 00 40 00 40 00 40 00 20 00 20 00 20 00 20 00
20 00 40 00 40 00 20 00 20 00 20 00 20 00 20 00 20 00 20 00 20
00 20 00 20 00 ef 8d 02 ef ad 01 b0 82 77 b0 82 7d ef e5 fd ef
4a 02 ef d1 01 71 cf 60 ef 3a bc ef 22 03 ef 46 0c ef 99 03 d7
f8 32 62 03 ef 72 a9 ef 76 02 ef 35 0c ef 59 0d 3e 04 5e 3d 04
12 3f 77 58 33 7d ee 71 f7 7d ef a3 09 91 40 27 e7 79 02 71 df
04
```

Operation of Invention

A modem is a device which converts electronic binary signals used by electronic computing equipment into analog signals which are compatible with the telephone system. Thus two modems appropriately attached to two computers will allow these computers to exchange data over the telephone system. This invention is a low cost general purpose 9600 BPS modem. It achieves its performance goals because it adapts and improves low cost readily available modem technology. The stated performance goals are: One; the modem should be highly interactive, being able to operate in full duplex mode during normal keyboard and terminal operation between modem connected computers. Two; the modem should be able to transfer data streams at 9600 BPS. Three; it must achieve both the preceding functions in seamless manner which is transparent to the modem user.

Two modem protocols are used to achieve these goals. CCITT v.21 is a 300 BPS full duplex protocol capable of fine keyboard and screen interaction but useless for high speed data transfer. CCITT v.29 is capable of transferring data at 9600 BPS, but in its commonly available form it is useless as an interactive protocol. It is a one direction (half duplex) protocol requiring approximately 0.5 seconds to reverse direction. Thus it requires over one second for a typist to see his typing being echoed back to his screen from a remote computer. Both of these protocols are implemented in readily-available, low-cost facsimile data pumps. Neither of these protocols is defined in such a way that they will interact in a seamless manner with another protocol, but they both have desirable characteristics. The key to this invention is the manipulation on these protocols in such a manner that they form a new or extended protocol which provides the desirable characteristics of both without the limitations of either.

FIG. 1 is a block diagram of the preferred embodiment. Processor 4 controls the overall functionality of the modem. Processor 4 receives its instructions from a computer program stored in ROM 5 and uses RAM 6 for temporary storage of variables and data.

Data generated by the external computing device arrives as a serial bit stream at connector 1 and then flows into UART 2. UART 2 converts the incoming serial data into parallel data bytes which are either seven or eight bits wide. UART 2 also sends and receives appropriate control signals to and from connector 1 according to the "RS-232" serial port interface standard. Each data byte received by UART 2 flows through bus 3 to processor 4. If SCC 8 is ready to process a new byte of data, processor 4 will send the current byte the SCC. Otherwise the current byte will be temporally stored in a buffer in RAM 6.

Although an SCC may seem like an unnecessary cost in a very low cost modem design, it plays a strategic role in function, performance and reliability of this modem architecture. Although the detail operation of an SCC is beyond the scope of this invention it is known to those skilled in the Art. The SCC used in this preferred embodiment is the Zilog 8530. Its important functions relative to this invention follow: First; it implements the industry standard HDLC protocol which allows the data to be transmitted in large synchronous blocks instead of small asynchronous bytes which contain additional stop and start bits. This provides approximately a 20% speed increase over a simple asynchronous modem. Secondly; it provides the basis for hardware error detection and correction. Thirdly; it forces the data into predetermined block formats with control and data fields. This is particularly important when switching data speeds, because as one modulator turns off and the other modulator turns on, the demodulators of the distant modem will be receiving noise and random bits of data. Fourth; it provides unique predetermined bytes called synchronization bytes, SB. These play an important role in all the preceding SCC functions and they are used in this invention to provide the important function of keeping modem performance high even if the external computing device might be sluggish in its supply of data.

Continuing with the data flow, SCC 8 forms parallel data bytes into large, but reliable data blocks. It then converts these blocks back to serial data which it sends to modulator 9. Modulator 9 converts the digital data stream into analog information which is compatible with the telephone system. The output of modulator 9 feeds into hybrid 11 which combines both send and receive information into one telephone circuit, terminating at telephone jack 12. Telephone jack 12 provides the interface to the external telephone system.

When two modems begin to communicate with each other, they first communicate in full duplex, low speed operation, v.21. At this time both modems are negotiating with each other and setting their common modulation and data delivery methods. After this brief period of time, processor 4 instructs UART 2 to turn on the Clear To Send signal, CTS. UART 2 sends this signal over one of the signal lines connected between UART 2 and connector 1. The appearance of CTS on connector 1 informs the computing device connected to connector 1 that the modem is ready to receive data. A complimentary signal generated by the computing device, Request To Send, RTS, also appears at connector 1. This informs the modem that the computing device is ready to send data. When both RTS and CTS are turned on, data may flow into the modem.

Normally the first data flowing into the modem is slow keyboard interaction and is appropriately transferred in lower speed v.21 mode. The input data rate must be constantly measured to determine if it is coming in faster than the v.21 speed of 300 BPS. This is done by measuring the time duration between a predetermined number of input data bytes received from the external computing device. Timer 7 establishes timing mechanisms for this function. For example, if the duration of time between three successive data bytes is less than 100 milliseconds, the data is arriving faster than 300 bps. At this time processor 4 will send a Request for High Speed, RHS, instruction to the remote modem. The remote modem will then send an Acknowledged High Speed request, AHS. Upon receipt of the AHS, processor 4 turns off v.21 modulation and demodulation and turns on half duplex high speed modulation, v.29 transmission mode.

This switch up to v.29 mode requires more than 500 Ms. During this time period many data characters have been temporarily stored in the buffer memory of RAM 6. When the v.29 modulator is switched on, the excess data stored in RAM 6 will rapidly diminish due to the high speed of the data channel. The number of remaining data bytes will also be a function of the input data speed. At some point a decision must be made to switch back to low speed interactive mode. One way to do this would be to switch back to v.21 when a predetermined number (perhaps 0) data bytes were left remaining in buffer of RAM 6. Unfortunately, in many small computer systems with slow disk access there may be several millisecond time delays when the computing device continues to supply the 9600 BPS data rate to the modem. Under these circumstances, the switch back method above would force a return to low speed. Then the real average data rate would immediately force a return to high speed. This cycle would continue. The result would be a very inefficient and slow data throughput because most of the time would be spent in the transition periods between speeds.

The first step in the solution to this problem is to measure the time interval between successive data bytes arriving from the external computing device. Timer 7 is used for this function. At 9600 bps there is about 1 millisecond between successive data bytes. This invention switches back to low speed after a predetermined time has elapsed between successive data bytes being received from the external computing device. A 10 millisecond elapsed time threshold is a good compromise between slow computing devices and time efficiency. When this threshold is exceeded an end of transmission is sent to the remote modem causing it to switch back to low speed.

When a modulator is turned on it must always be supplied with real data, otherwise extra ONEs or ZEROs will show up in the data stream during the data delays. The second step of the solution to the data delay problem is the insertion synchronization bits in the empty time spaces where data should be. Thus the modulator and demodulator requirements are fulfilled. There is always valid data being modulated or demodulated. Yet the SCC may insert these synchronization bytes at the transmitting end and remove them from the receiving end without creating errors in the data stream. The data will continue to flow at high speed and the periodic spaces in time without data will not force incorrect modulation rate transitions into the modem operation.

Software programs which contain error correction protocols are normally used in conjunction with modems to insure that the data being received is correct. The more efficient protocols in use at this time do not require any acknowledgement from the receiving end that the transmitted data is correct. They do require that a Retransmission Request, RR, be sent from the receiving end if a block of data contains an error. In a normal half duplex connection there is no opposite direction transmission channel to allow the receiver to signal back to the transmitter that an error has occurred. This could only be done at the end of transmission of high speed data. If a large, for example 400,000 bytes, file is being sent and an error occurred in the first 1,000 bytes, an additional 399,000 bytes would have to be re-transmitted. This would double the actual transmission time. If occasional errors continued, as they often do, large files would be impractical to transmit.

This solution to this problem is to force the modem to revert back to full duplex operation at predefined data intervals. Data intervals between 4,000 and 12,000 bytes of data seem to be a good compromise between turn around delays and error control protocol function.

This is a very simple function for processor 4. A counter is set to zero at the beginning of high speed transmission. The counter is incremented once for each data byte being transmitted. When the counter reaches a predetermined value, processor 4 terminates high speed transmission and initiates low speed full duplex operation. If an error has occurred, a request for retransmission can be sent by the distant modem, and the error corrected. The modems resume high speed operation and the next portion of the file is transmitted.

Data being received by the modem flows through the system in reverse order of that being transmitted. Analog data from the telephone system arrives at telephone jack 12. It flows to hybrid 11 where it is separated from transmitted data. It then flows to demodulator 10 where it is converted into a serialized binary signal and forwarded to SCC 8. SCC 8 unblocks the data, removes all synchronization bytes and forwards the data through bus 3 to processor 4 as eight bit parallel bytes. Processor 4 forwards each byte to UART 2 via bus 3. UART 2 then converts the parallel data bytes to serial data and forwards the serial data to connector 1 via the RXD signal line.

The external computing device retrieves the received data at connector 1.

While the above description contains many specificities, these should not be construed as limitations on the scope of the invention, but rather as an example of one preferred embodiment thereof. Many other variations are possible. For example, two or more of the components described above could be integrated into a common integrated circuit. All of timer 7, and SCC 8, and portions of modulator 9 and demodulator 10 can be implemented with a single low cost processor 4 and appropriate instructions contained in ROM 5. Likewise it should be understood that this invention is not limited to v.21 and v.29 modulation standards. Other modulation techniques may also be used, for example: v.22, v.22bis, v.33, and Bell 103 or 212. Also other data timing and speeds and thresholds may be used. Accordingly, the scope of the invention should be determined not by the embodiment illustrated, but by the appended claims and their legal equivalents.

I claim:

1. A modem for switching between a plurality of protocols and for connecting digital data terminal equipment to an analog communication link, the modem comprising in operative combination;
   a first connector coupled to the data terminal equipment for receiving first serial signals from the data terminal equipment;
   a receiver transmitter coupled to the first connector for receiving and converting the first serial signals to parallel signals;
   an organized plurality of signal lines coupled to the receiver transmitter for transferring the parallel signals;
   a processor coupled to the organized plurality of signal lines for receiving the parallel signals;
   a controller coupled to the organized plurality of signal lines for receiving the parallel signals;
   a first memory coupled to the organized plurality of signal lines for receiving the parallel signals;
   a second memory coupled to the organized plurality of signal lines for storing the plurality of protocols for operation of the modem;
   a timer coupled to the organized plurality of signal lines for providing timing signals to the processor through the organized plurality of signal lines;
   the processor for receiving the timing signals and the parallel signals for determining a rate of data from the data terminal equipment, the processor further for providing a first control signal when the rate of data is greater than a first predetermined value, the first control signal for providing one of the plurality of protocols for operation of the modem;
   the controller for converting the parallel signals into data blocks and for converting the data blocks into second serial signals; and
   a modulator coupled to the controller for receiving the second serial signals and for converting the second serial signals to first analog signals, the modulator further coupled for receiving the first control signal, the modulator selectively operable at a plurality of modulation rates, the modulator for selected operation at a first determined modulation rate due to the first control signal and the one of the plurality of protocols, the modulator for converting the second serial signals to the first analog signals at the first determined modulation rate; and
   transfer means for transferring the first analog signals to the analog communication link.

2. A modem, as recited in claim 1, wherein the processor further is for providing a second control signal when the rate of data from the data terminal equipment is less than a second predetermined value, the second control signal for providing another of the plurality of protocols for operation of the modem, the modulator further coupled for receiving the second control signal and for selected operation at a second determined modulation rate in response to the second control signals, and the modulator further for converting the second serial signals to the first analog signals at the second determined modulation rate.

3. A modem, as recited in claim 2, further comprising a demodulator coupled to the controller and to transfer means, the transfer means further for receiving second analog signals from the analog communication link, the demodulator coupled to the transfer means for receiving the second analog signals and converting the second analog signals to third serial signals.

4. A modem, as recited in claim 3, wherein the demodulator is selectively operable at a plurality of demodulation rates, the demodulator coupled to the processor for receiving the first control signal and for selected operation at the first determined demodulation rate in response to the first control signal, and the demodulator further for converting the second analog signals to the third serial signals at the first determined demodulation rate and for providing the third serial signals to the controller.

5. A modem, as recited in claim 4, wherein the demodulator is coupled to the processor for receiving the second control signal and for selected operation at the second determined demodulation rate in response to the second control signal, and the demodulator further for converting the second analog signals to the third serial signals at the second determined demodulation rate.

6. A modem, as recited in claim 5, wherein the processor is for determining when the rate of data from the data terminal equipment is greater the first predetermined value based on a predetermined amount of data in the first memory.

7. A modem, as recited in claim 6, wherein the first predetermined value is approximately 300 bits per second, and the second predetermined value is approximately 9600 bits per second.

* * * * *